(12) United States Patent
Snelson

(10) Patent No.: US 7,260,898 B2
(45) Date of Patent: Aug. 28, 2007

(54) DRY WALL CUTTING TOOL FOR MEASURING TAPE

(76) Inventor: Rick Dale Snelson, 43385 Illinois Ave., Palm Desert, CA (US) 92211

( * ) Notice: Subject to any disclaimer, the term of this patent is extended or adjusted under 35 U.S.C. 154(b) by 27 days.

(21) Appl. No.: 11/520,890

(22) Filed: Sep. 14, 2006

(65) Prior Publication Data

US 2007/0068026 A1     Mar. 29, 2007

Related U.S. Application Data

(60) Provisional application No. 60/721,398, filed on Sep. 28, 2005.

(51) Int. Cl.
   *G01B 10/00*   (2006.01)
(52) U.S. Cl. .......................... 33/668; 33/770
(58) Field of Classification Search ................ 33/668, 33/759–760, 768, 770, 42
   See application file for complete search history.

(56) References Cited

U.S. PATENT DOCUMENTS

| | | | |
|---|---|---|---|
| 2,818,644 A | 1/1958 | Crawford | |
| 2,952,025 A | 9/1960 | Johnson | |
| 3,509,631 A * | 5/1970 | Shimoyama | 33/27.01 |
| 4,255,856 A | 3/1981 | Mackie | |
| 4,903,409 A | 2/1990 | Kaplan et al. | |
| 4,949,462 A | 8/1990 | Spencer | |
| 4,976,037 A | 12/1990 | Hines | |
| 4,993,093 A | 2/1991 | Goldwitz | |
| 5,035,054 A | 7/1991 | Ellenberger | |
| 5,048,189 A | 9/1991 | Aurness et al. | |
| 5,083,375 A | 1/1992 | Helm, Sr. | |
| 5,206,965 A | 5/1993 | Rowley | |
| 5,231,764 A | 8/1993 | Chang | |
| 5,289,637 A | 3/1994 | Coffey | |
| 5,349,760 A * | 9/1994 | DeVito | 33/668 |
| 5,379,524 A * | 1/1995 | Dawson | 33/768 |
| 5,406,711 A | 4/1995 | Graham | |
| 5,542,184 A | 8/1996 | Beard | |
| 5,842,284 A | 12/1998 | Goldman | |
| 5,966,820 A | 10/1999 | Cornacchio et al. | |
| 6,070,338 A | 6/2000 | Garity | |
| 6,298,562 B1 | 10/2001 | Duquette | |
| 6,442,863 B1 | 9/2002 | Poineau et al. | |
| 6,546,644 B2 | 4/2003 | Poineau et al. | |
| 6,612,035 B2 | 9/2003 | Brown et al. | |
| 6,694,622 B2 * | 2/2004 | Kim | 33/770 |
| 6,763,603 B2 | 7/2004 | Carrabino | |
| 6,912,799 B1 * | 7/2005 | Smith | 33/770 |
| 6,931,734 B2 * | 8/2005 | Elder et al. | 33/668 |
| 2003/0019116 A1 | 1/2003 | DeWall | |
| 2003/0159304 A1* | 8/2003 | Black | 33/668 |
| 2004/0231171 A1 | 11/2004 | Cornacchio | |
| 2005/0022390 A1 | 2/2005 | Whitemiller et al. | |

* cited by examiner

*Primary Examiner*—Yaritza Guadalupe-McCall

(57) ABSTRACT

A device for holding together a measuring tape and a cutting blade. This device comprises a flat shaped housing which includes a first shallow cavity into which a first portion of the cutting blade can be inserted; a second cavity in the shape of a slot, into which the tape bracket can be inserted; a cover hingedly attached to the housing for covering the first cavity; and a snap latch mechanism for locking the cover to, or unlocking it from, the housing. The device also comprises a blade safeguard shield attached by a hinge to the housing, for optionally covering the unshielded portion of the blade when the device is not in use.

6 Claims, 4 Drawing Sheets

DRY WALL CUTTING TOOL FOR MEASURING TAPE

This invention claims the benefit of U.S. Provisional Application No. 60/721,398 with the same title, "Dry Wall Cutting Tool for Measuring Tape" filed on Sep. 28, 2005 and which is hereby incorporated by reference. Applicant claims priority pursuant to 35 U.S.C. Par 119(e)(i). The present invention relates to cutting devices adapted to cut sheet materials such as drywall and the like. More particularly, it relates to handheld devices for cutting drywall material wherein the device is adapted to be mounted at the tip of a self-winding measuring tape.

FIELD OF THE INVENTION

BACKGROUND

The traditional method of cutting sheetrock or drywall material into rectangles of prescribed dimensions requires the use of a self-winding measuring tape and a cutting tool such as a box cutter. The user, with both hands, holds the tape extended to the correct dimension. With his thumb, he holds the tip of the tape measure against a utility knife. With the other hand he holds the tape reel and extends the tape measure to the correct dimensions across the sheet of drywall, placing the tape reel against the edge of the sheet of drywall. He performs his cut by pressing on the drywall with the knife and moving down both hands simultaneously.

Using the traditional method, the user must handle two objects simultaneously with one hand while keeping the tape extended to the correct measurement. Every time he puts down the tape and knife to position a sheet of drywall for a new cut, he must waste time rearranging these objects in his hands. The present invention is an improvement because it is so designed as to firmly affix the cutting blade to the end of the measuring tape, as well as provide the user with a safe drywall cutting tool.

Several patents have tried to improve on this basic idea. For example U.S. Pat. No. 6,070,338 by Garity describes a tape system equipped with a tab placed at the end of the tape. The user places the tape casing as a guide onto the edge of a piece of sheetrock, draws the tape measure out to the desired measurement and locks it into position. He then holds the utility knife against the outside surface of the tab, and draws the tape measure and knife along the edge of the sheetrock, scoring a cut that is parallel to the edge of the sheetrock. Garity's invention requires two separate objects that the user must manipulate, and therefore represents a loss in work efficiency.

Another U.S. Pat. No. 5,966,820 by Cornacchio also makes use of a utility knife separate from the tape. The manipulation of two objects complicates work and reduces efficiency.

Yet another U.S. Pat. No. 5,542,184 by Beard makes use of a cutter attached to the end of a tape. In his proposed configuration the blade is always exposed and presents a danger to the user. In addition the method of securing the blade requires elaborate manipulation to remove or change the blade.

Still yet another U.S. Pat. No. 6,612,035 by Brown describes a method for cutting drywalls. His technique requires a special measuring T-shape ruler and does not take advantage of the ubiquitous availability of tape measures at construction sites.

None of the prior art offers the simplicity and economy of use of this invention. Further features, aspects, and advantages of the present invention over the prior art will be more fully understood when considered with respect to the following detailed description claims and accompanying drawings.

SUMMARY OF THE INVENTION

Figure 1:
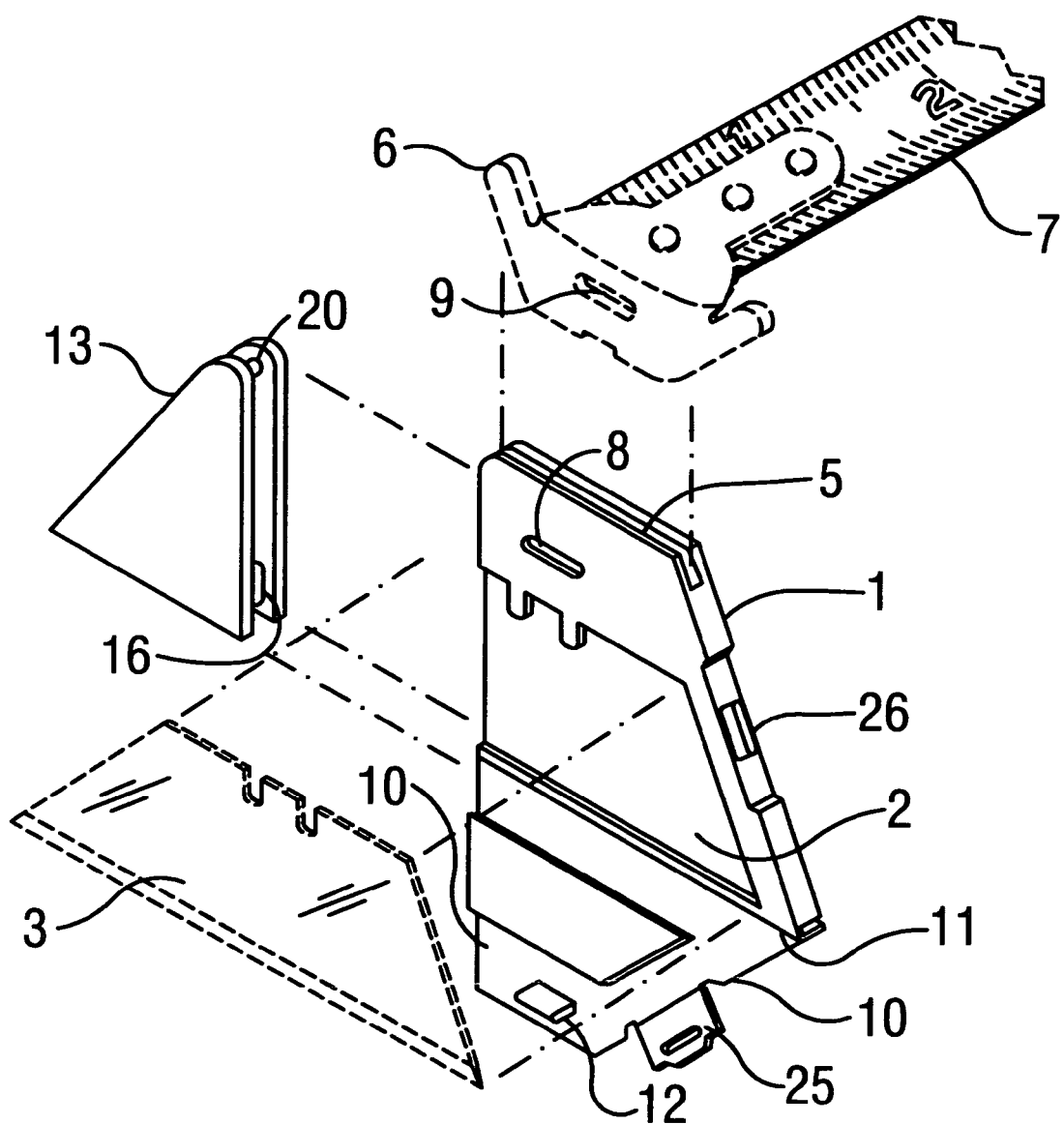
FIG. 1 describes the device holding a measuring tape and a disposable cutting blade in an exploded view, with the cover and blade shield open.

This invention describes a device for holding together a measuring tape terminated by a 90 degree bracket, and a trapezoidal cutting blade. It comprises a flat shaped housing and a hinged blade safeguard shield. The housing includes the following:

a shallow cavity that approximately matches in shape a portion of the cutting blade. The blade can be partially inserted into this cavity and therefore be partially shielded leaving an exposed portion of the blade.

A second cavity in the shape of a slot. This slot has the approximate thickness of the tape bracket thus allowing the insertion of the tape bracket.

A cover which is attached to the main housing by means of a hinge. This cover is used to hold the blade in place in the shallow cavity.

A snap latch mechanism for locking the cover to, or unlocking the cover from, the housing. The snap latch mechanism comprises a tongue mounted on the cover. This tongue is traversed by a hole. The snap-latch mechanism furthermore comprises a protuberance mounted on the housing. Both tongue hole and housing protuberance matching in position and latch together when the cover is closed and the tongue is pressed on the protuberance.

The device also includes a blade safeguard shield attached by means of a hinge to the housing. This safeguard shield is shaped in part as a slot into which the unshielded portion of the cutting blade can fit, for optionally covering the unshielded portion of the blade when the device is not in use.

The latching mechanism for closing the device requires that the tape bracket be traversed in its end section by an opening. This opening matches in position and shape another opening arranged in the anterior wall of the slot cavity holding the tape bracket. A protuberance located in the inside surface of the cover approximately matches in shape and position the opening in the tape bracket and the opening in the anterior wall of the slot cavity holding the tape. This arrangement allows the protuberance to penetrate the opening in the anterior wall and the opening in the tape bracket thus allowing the cover to firmly latch onto the housing and remain firmly closed.

The hinge that attaches the blade safeguard shield to the housing includes two coaxial protuberances on the inside of the safeguard slot. It also includes two coaxial indentations; the first indentation is mounted on the anterior side of the cover; the second indentation is mounted on the posterior side of the housing. The protuberances and the indentations are axially coincident and snap together thus hingedly attaching the blade safeguard shield to the housing.

The blade safeguard shield can also be latched to the housing by a latching mechanism. This mechanism comprises two protuberances on the inside of the slot in the safeguard shield. It also comprises two indentations, the first indentation mounted on the anterior side of the cover and the second indentation mounted on the posterior side of the housing. These protuberances and indentations are axially coincident to allow the safeguard shield to snap onto the housing when the safeguard shield is rotatably closed.

DETAILED DESCRIPTION

Figure 2:
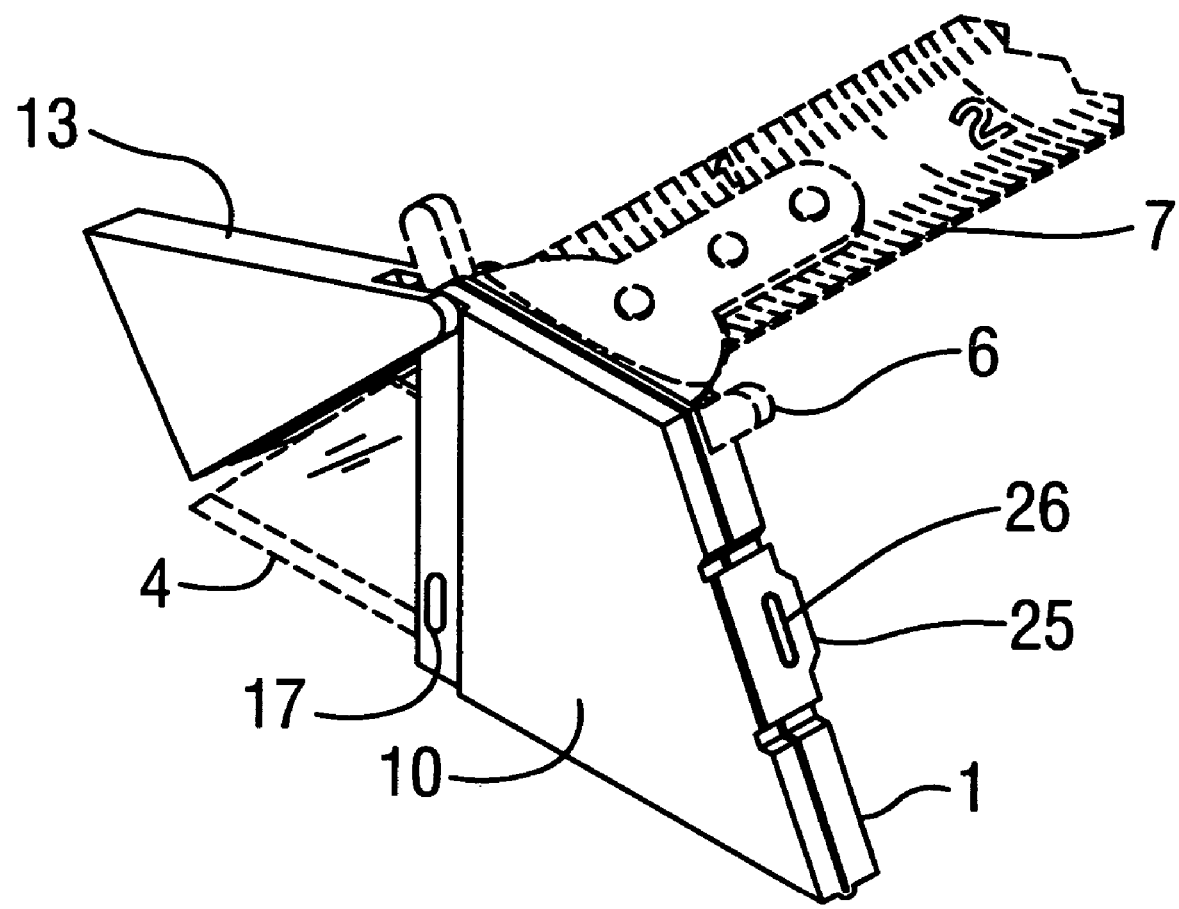
FIG. 2 illustrates the device mounted at the end of a measuring tape and in a configuration ready for use.

The present invention is a device that holds a disposable cutting blade and is specifically designed to be affixed on the end of a self-winding tape. In its preferred embodiment the device is made of plastic or the like. As shown in FIG. 1 the device comprises a main housing 1 which is a plate generally trapezoidal in shape. This main housing 1 comprises two cavities. The first cavity 2 is shaped to hold and partially shield a trapezoidal utility blade. The shielded portion of the blade 3 rests in the cavity 2 which therefore matches in shape and contains this portion of the blade. As shown in FIG. 2, the unshielded portion 4 of the blade 3 is allowed to protrude outside of the main housing 1, to be used to cut drywall.

The second cavity 5 is shaped as a slot to match and contain the bracket 6 mounted on the end of a measuring tape 7. This slot cavity also includes in its side an opening 8 matching in position and shape an opening 9 located in the center of the bracket 6. As shall be explained below, the opening 8 is part of the locking mechanism of the device, which is specially designed to be used with widely used tapes such as the ones made by the Stanley or Craftsman companies.

A cover plate 10 is hinged to the wide base of the main housing, and can be rotatedly shut to close the cavity 2 thereby holding in place the blade 3. The hinge 11 is made of the same material as the rest of the device and is of the type sometimes called "flex hinge" or "living hinge." It is a thin section of the plastic which is flexible because of its thinness. The cover plate 10 includes a protrusion 12 on the side away from the hinge 11 and facing the main housing 1. This protrusion 12 is positioned on the cover plate 10 so as to face the opening 8 on the side of the slot cavity 5 and penetrates the opening 9 in the tape bracket 6 thus holding the tape 7 in place. In addition, the cover plate 10 includes on its side a snap-latch mechanism. This mechanism comprises a tongue 25 traversed by a hole. This hole engages a protuberance 26 mounted on the main housing 1. Thus when the cover 10 is closed against the main housing 1, the protrusion 26 engages the hole in the snap-latch 25 thereby locking in place both the tape 7 and the blade 3.

Figure 1A:
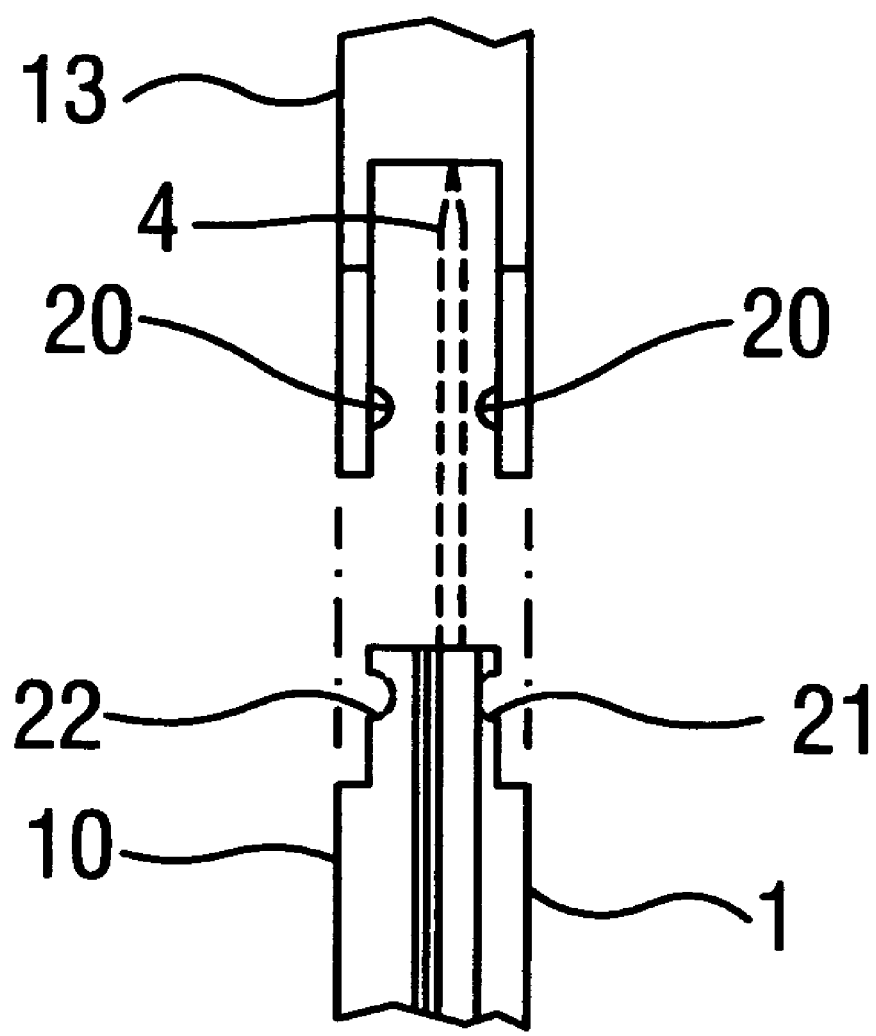
FIG. 1A is a cross section of hinge for the blade safeguard shield.

A blade safeguard shield 13 shown in detail in FIG. 1A, is hinged to the top of the main housing 1 on the side displaying the unshielded blade portion 4. This safeguard shield 13 can be rotated either to cover the unshielded blade portion 4 if it is not in use, or to uncover it if it is in use. The hinge used for the blade safeguard shield 13 is of a snap-on kind, comprised of two protuberances 20 carried on the inside surface of the safeguard shield and two indentations co-axially aligned with the two protuberances. The first indentation 21 is located on the back of the main housing, and the second indentation 22 is located on the cover plate 10. The blade safety guard 13 is partially shaped as a slot, wide and large enough to hold the exposed portion 4 of the blade. The safety guard 13 can be held in place by a safety latch comprised of a pair of protuberances 16 mounted on the safety guard 13 and a pair of indentations 17, the first indentation mounted on the back of the main body 1 and the second indentation mounted on the cover plate 10.

FIG. 2 shows the device mounted at the end of a measuring tape 7 with the blade 3 unshielded and locked into place. This configuration is suitable when the device is ready for use.

Figure 3:
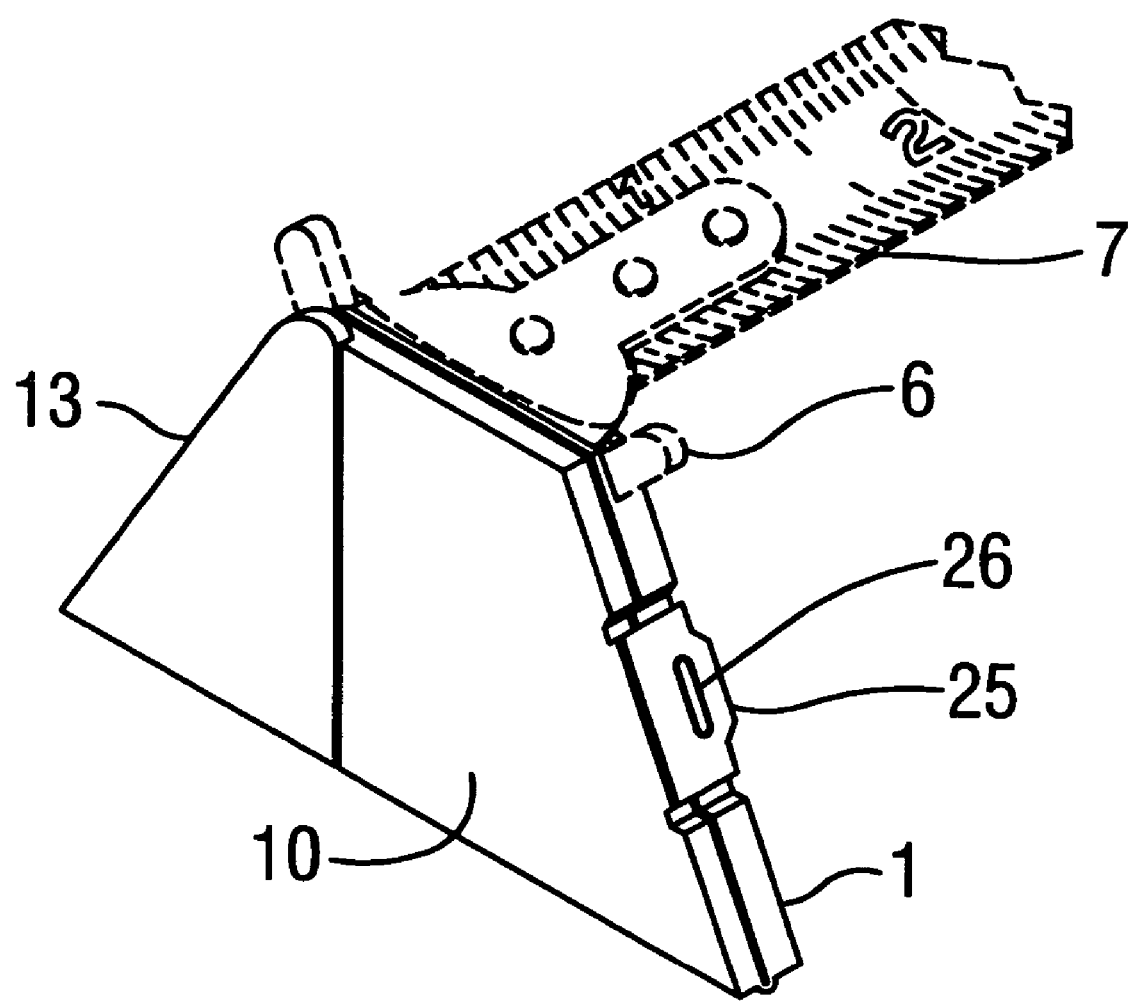
FIG. 3 shows the device mounted at the end of a measuring tape and in a configuration ready for being stored away.

FIG. 3 shows the device mounted at the end of a measuring tape 7 and in closed configuration such that the blade 3 is in place and shielded. This configuration is suitable when the device is not in use.

Usage of the device is simple: to insert a blade or to change the blade 3, the user must detach the safety guard 13 from the main housing 1. The guard 13 can be removed by unsnapping the hinge holes 20 on the guard 13 from the protuberance 21 on the main housing 1 and the protuberance 22 on the cover 10. Once the guard 13 is removed the cover 10 can be rotatably opened. The old blade 3 is removed from the cavity 2 and a new blade is inserted. The cover 10 is then closed and locked into place by closing the snap-latch 25. The guard 13 is then reinstalled on its hinge 20, 21 and 22, thus further locking the blade 3 into place.

When the device is used, the safety guard 13 unhinges automatically when the device is pressed against the drywall. Alternatively, the guard 13 can be lifted manually. After use of the device, the guard 13 must be manually closed to reduce the possibility of injuries.

To cut drywall, the user must adjust his tape 7 to the right length. With one hand he holds the tape reel against the edge of the drywall and with the other hand he holds the cutting edge of the device against the drywall. Applying pressure against the drywall automatically lifts the blade guard 13, thus exposing a portion of the blade 4. Moving down both hands simultaneously, he can then cut the drywall. When he is finished cutting, he can cover the unshielded portion of the blade 4 with the safeguard shield 13 and then put his cutting tool away in the closed position as shown in FIG. 3. One should note that the amount of force needed to cut the drywall must be sufficient to allow the blade to cut only though the paper on the sheetrock. The sheetrock can then be snapped in half with hand pressure.

While the above description contains many specificities, the reader should not construe these as limitations on the scope of the invention, but merely as exemplifications of preferred embodiments thereof. Those skilled in the art will envision many other possible variations within its scope. Accordingly, the reader is requested to determine the scope of the invention by the appended claims and their legal equivalents, and not by the examples which have been given.

I claim:

1. A device for holding together a measuring tape terminated by a 90 degree bracket, and a trapezoidal cutting blade, comprising:
    a) a flat-shaped housing comprising:
        i) a first shallow cavity, approximately matching in shape a first portion of said trapezoidal cutting blade and into which said first portion can be inserted, thereby shielding said first portion, and leaving exposed second unshielded portion of said cutting blade;
        ii) a second cavity in the shape of a slot, said slot having a thickness approximately the same as the thickness of said tape bracket and into which said tape bracket can be inserted;

iii) a cover hingedly attached to said housing for covering said first cavity; and
iv) a snap latch mechanism for locking said cover to, or unlocking said cover from, said housing, said snap latch mechanism comprising a tongue mounted on said cover, said tongue traversed by a hole, said snap-latch mechanism furthermore comprising a protuberance mounted on said housing, said snap-latch hole and said snap-latch protuberance matching in position and latching together when said cover is closed and said tongue is pressed on said protuberance; and b) a blade safeguard shield attached by means of a hinge to said housing, wherein said safeguard shield is in part shaped as a slot into which said unshielded portion of said cutting blade can fit, for optionally covering said unshielded portion of said blade when said device is not in use.

2. A device as in claim 1 wherein
a) said tape bracket is traversed in its section perpendicular to said tape, by an opening;
b) said slot formed by said second cavity comprises an anterior wall on the side away from said tape and a posterior wall on the side near said tape, both said walls being formed out of the material of said housing, said anterior wall being traversed by an opening axially coincident with tape bracket opening when said tape bracket is snuggly inserted in said slot, and said anterior wall opening approximately matching in shape said tape bracket opening;
c) said cover carries on its inner surface a protuberance, said protuberance approximately matching in shape said anterior wall opening and said bracket opening, thereby allowing said protuberance to penetrate said anterior wall opening and said tape bracket opening, when said cover is rotatably closed, and allowing said cover to firmly latch onto said housing and remain firmly closed.

3. A device as in claim 1 wherein said safeguard shield hinge comprises two protuberances and two indentations, said protuberances located on the inside of said slot formed by said safeguard shield, the first indentation mounted on the anterior side of said cover, anterior side defined as the side away from said tape, and the second indentation mounted on the posterior side of said housing, posterior side defined as the side nearer said tape, said protuberances and said indentations being axially coincident and snapping together thus hingedly attaching said safeguard cover to said housing.

4. A device as in claim 3 comprising a safeguard shield latch for latching said safeguard shield to said housing wherein said safeguard shield latch comprises two protuberances on the inside of said safeguard shield slot and two indentations, the first indentation mounted on the anterior side of said cover and the second indentation mounted on the posterior side of said housing, said protuberances and said indentations being axially coincident thereby allowing said safeguard shield to snap onto said housing when said safeguard shield is rotatably closed.

5. A device as in claim 1 wherein said safeguard shield hinge comprises two protuberances and two indentations, said indentations located on the inside of said slot formed by said safeguard shield, the first protuberance mounted on the anterior side of said cover, anterior side defined as the side away from said tape, and the second protuberance mounted on the posterior side of said housing, posterior side defined as the side nearer said tape, said protuberances and said indentations being axially coincident and snapping together thus hingedly attaching said safeguard cover to said housing.

6. A device as in claim 5 comprising a safeguard shield latch for latching said safeguard shield to said housing wherein said safeguard shield latch comprises two protuberances on the inside of said safeguard shield slot and two indentations, the first indentation mounted on the anterior side of said cover and the second indentation mounted on the posterior side of said housing, said protuberances and said indentations being axially coincident thereby allowing said safeguard shield to snap onto said housing when said safeguard shield is rotatably closed.

* * * * *